June 2, 1931.  C. GOTTFRIED  1,808,163
AUTOMATIC FLOW CONTROLLER
Filed Nov. 22, 1928   2 Sheets-Sheet 1
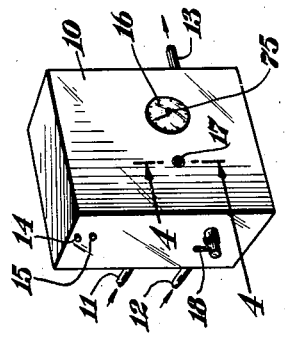
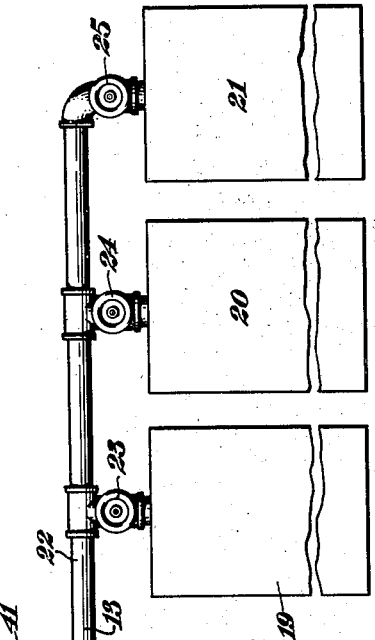
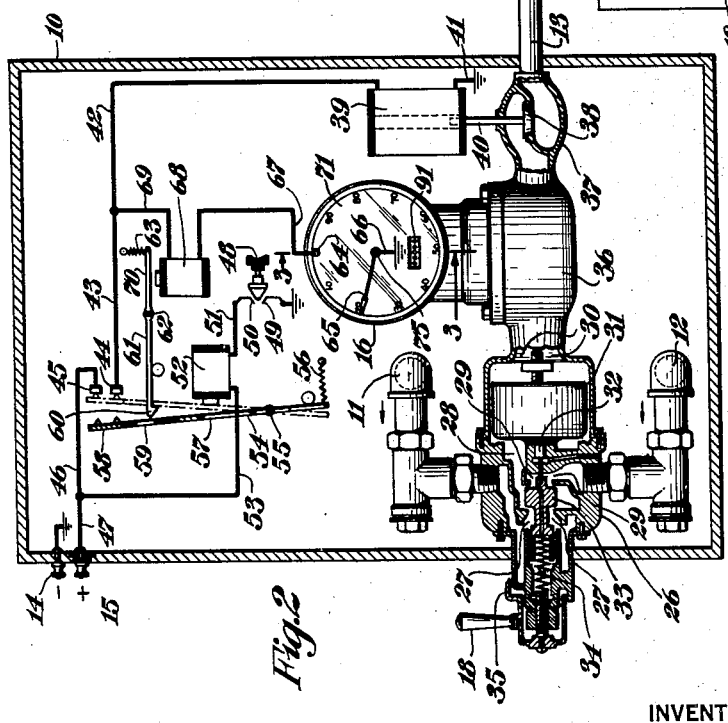
INVENTOR
*Charles Gottfried,*
BY
*Frederick Breitenfeld*
ATTORNEY June 2, 1931.  C. GOTTFRIED  1,808,163
AUTOMATIC FLOW CONTROLLER
Filed Nov. 22, 1928  2 Sheets-Sheet 2
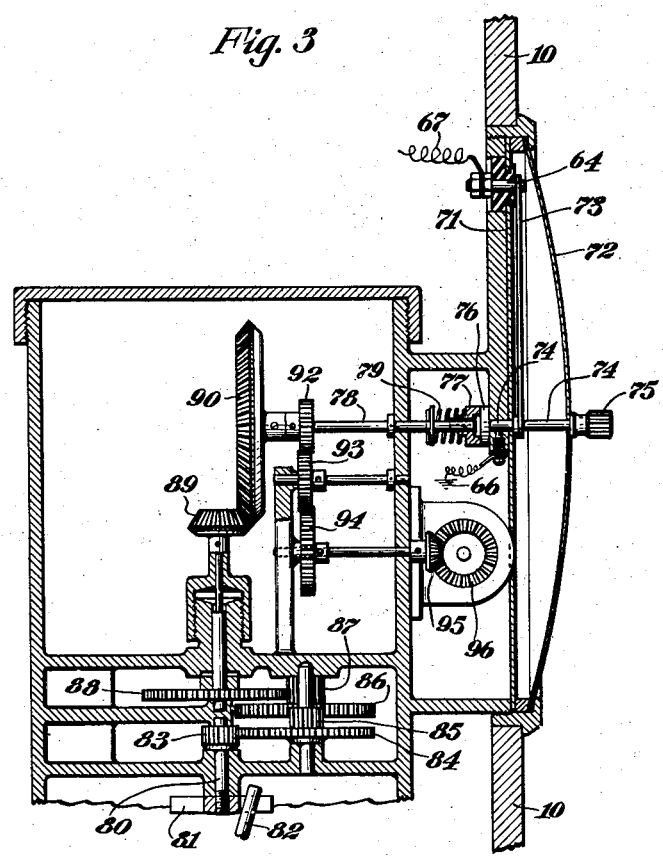
INVENTOR
Charles Gottfried,
BY
Frederick Breitenfeld
ATTORNEY

Patented June 2, 1931

1,808,163

UNITED STATES PATENT OFFICE

CHARLES GOTTFRIED, OF NEW YORK, N. Y.

AUTOMATIC FLOW-CONTROLLER

Application filed November 22, 1928. Serial No. 321,260.

My present invention relates generally to fluid-flow control, and has particular reference to an automatic flow-controller for effecting delivery of predetermined amounts of fluid.

Although I have herein illustrated and shall hereinafter describe my invention as applied to the baking industry, nevertheless it will be understood that my invention is not limited to a specific application of this character, having a far wider applicability which will be fully appreciated after this specification has been read.

For the purpose of explaining the nature of my invention, I have illustrated and described the same as it applies to the step or steps of making dough in a bakery. Before describing the details of my invention, as thus applied, I will premise that batches of dough are made in vats or mixers into each of which a predetermined quantity of water, at a predetermined temperature, is delivered to intermix with the flour and other ingredients similarly placed into the vat in predetermined amounts.

It has been the custom to provide a preliminary measuring tank in association with a group of mixing vats, the desired limited amount of water at the desired temperature being initially supplied to and measured off in the measuring tank, and being then allowed to flow by gravity into one of the mixers. Such measuring tanks occupy considerable space; they are positioned at a considerable height, which is frequently close to the ceiling; their operation entails considerable labor and time consumption; and it is unsatisfactory for other reasons, such as the periodic accumulation of sediment which must be removed.

Apart from the foregoing disadvantages of the measuring tanks heretofore customarily employed, I will point out that difficulty has been encountered in properly checking up the amount of water actually used by the operator. Such a check-up is of considerable importance because of the necessity, for obvious reasons, for insuring a proper prescribed intermixture of water and flour in each batch of dough. The tendency of an operator to employ less than the prescribed amount of water will obviously affect the constituency of the dough and will also have a material influence upon the total amount of flour or other ingredients employed over a period of time.

It is a specific object of my present invention to provide an automatic flow-controller which will obviate the necessity for measuring tanks as above described, which will simplify the procedure leading to the production of batches of dough, which will assure proper constituency of the dough at all times in accordance with a predetermined prescription, and which will afford a simple and reliable check upon the total amount of water employed.

More particularly, it is a specific object of my invention to provide a device which will effect successive delivery of predetermined desired amounts of water at predetermined temperatures with a minimum of manually operated steps.

From a broader aspect, it is a general object of my invention to provide a device which will automatically deliver predetermined quantities of fluid, of predetermined constituency, from any desired source or sources of such fluid to any desired chamber, vat, or the like, according to requirements.

Briefly, my invention resides in providing an inlet conduit or conduits adapted to be fed from the source or sources of fluid supply, an outlet or delivery conduit adapted to feed into the required tank or the like, a means for normally sealing the delivery conduit, a mechanism which is normally inoperative and which serves to unseal such delivery conduit, a manually controllable means for rendering said mechanism operative, and a manually adjustable automatic means for rendering said mechanism again inoperative after a predetermined time interval.

In combination with the foregoing, it is a feature of my invention to provide a means for feeding a plurality of fluids from a plurality of sources to the delivery conduit in predetermined constant proportions; also to provide a totalizing device which will indicate or record the total amount of fluid delivered from the apparatus.

Another feature of my invention resides in providing most of the foregoing elements of the apparatus in a form which is electrically operable, thereby simplifying construction and operation.

For the attainment of the foregoing objects and such other objects as may hereinafter appear or be pointed out, I have illustrated one form of my invention in the accompanying drawings, in which—

Figure 1 is a perspective view of a device of the present character, viewed from the exterior, and showing its compact nature;

Figure 2 is an elevational cross-section through the device, certain parts being shown unsectioned, others being shown diagrammatically, and showing also its association with three illustrative vats or tanks;

Figure 3 is an enlarged cross-sectional view taken substantially along the line 3—3 of Figure 2; and Figure 4 is a view similar to Figure 3 taken substantially along the line 4—4 of Figure 1.

My device is preferably so constructed as to be capable of complete enclosure within a casing 10, although the provision of such casing is not essential with respect to many phases of my invention. Leading from the casing are conduits 11 and 12 adapted to be connected to sources of fluid supply, also a delivery conduit 13 adapted to be connected in suitable manner to the conduit leading to the point of fluid consumption. Similarly accessible on the exterior of the casing are a pair of electrical terminals 14 and 15 for attachment to any commercial supply of electric current.

Dial and pointer elements (referred to generally in Figure 1 by the reference numeral 16) are enclosed in a visible manner within the casing 10. These elements are wholly inaccessible from the exterior with the exception of a single manually controllable knob or the like which will be hereinafter described. A push-button or switch 17 is similarly mounted for manual accessibility, and a third manually controllable element 18 is provided for controlling the constituency of the fluids entering through the conduits 11 and 12.

Assuming the apparatus to be employed in the baking industry, the inlet conduits 11 and 12 might be associated respectively with sources of cold and hot water under a slight feeding pressure, and the delivery conduit 13 might be associated in the manner shown with three mixers 19, 20, and 21. More particularly, a common conduit 22 may be made to lead to the mixers with valves 23, 24, and 25 suitably arranged to control the delivery of the water into a selected one of the mixing vats.

The inlet conduits 11 and 12 are suitably associated with a casing or chamber 26 within which the proportions of hot and cold water are automatically created and maintained in accordance with an initial setting of the manually controllable element 18. Thus, assuming the conduit 11 to feed hot water, this water finds it way into an annular space 27 and flows to the right (in Figure 2) into the space 28. Similarly, the cold water from the inlet conduit 12 finds its way into an annular space 29 and passes to the left (in Figure 2) into the space 28. The space 28 leads ultimately to an outlet opening 30 provided in the chamber 26.

Within the space 28 is a device 31 constructed to be automatically responsive to variations in temperature of the water flowing through the space 28. For example, I have shown a reciprocable spindle 32 projecting from the device 31 and carrying a valve 33 interposed between the annular spaces 27 and 29. As the water in the space 28 increases in temperature, the spindle 32 is forced to the left, thereby reducing the amount of hot water flowing from the space 27 into the space 28, and if the temperature of the water in the space 28 decreases, the spindle 32 automatically moves to the right and has a similar effect upon the cold water flowing from the space 29 into the space 28. To control the proportionate amounts of hot and cold water, the valve 33 is suitably associated with a spring 34 whose tension is controlled by the element 18. If a relatively high temperature is desired, the spring 34 is so adjusted, in accordance with an externally visible scale or pointer 35, that the movement of the valve 33 to the left in Figure 2 will be rendered more difficult. If a relatively colder temperature is desired, the spring is adjusted in the opposite manner.

The outlet 30 feeds into a chamber 36 within which certain mechanism is arranged for operation proportionately to the flow therethrough. Before describing this mechanism, I will point out that the liquid passes out of the chamber 36 into a valve 37 and thence into the delivery conduit 13. The valve proper 38 is normally closed so as to seal the delivery conduit 13, this valve being retained in such closed position either by a spring, by the pressure of the liquid itself, or both.

A normally inoperative mechanism for unsealing the conduit 13, i. e., for controlling the opening of the valve 38, comprises the solenoid 39 into association with which the valve stem 40 extends. The electric circuit for the solenoid 39 may be traced from the ground or negative end 41 of the solenoid, through the latter, through leads 42 and 43 to one terminal 44 of a normally open switch. From the other terminal 45 of the normally open switch, leads 46 and 47 connect with the positive terminal 15. For purposes of simplification, the negative terminal 14 has been shown as grounded, the circuit being thus completed.

A manually controllable means is provided for rendering the foregoing circuit operative to energize the solenoid 39 and thereby to open the valve 38. This means comprises the push-button or momentary-contact switch 48 whose manipulation establishes connection between the spaced complementary contacts 49 and 50. The contact 49 is grounded, while the contact 50 is connected by a lead 51 to and through a solenoid 52, thence through a lead 53 to the positive terminal 15. A lever or contact arm 54 is pivoted at 55 and is normally held in the full-line position of Figure 2 by the tension spring 56. The lever 54 is provided with a portion 57 adapted to be attracted by the solenoid 52 to pivot the lever into the dot and dash position. The lever 54 is also provided with a contact portion 58 adapted to establish electrical connection between the contacts 44 and 45 when the lever is swung into the dot and dash position.

To hold the lever 54 in the dot and dash position after a single manipulation of the switch 48, I provide a latch mechanism which I have illustratively shown by means of an aperture 59 in the lever 54, and a keeper 60 carried at the end of a latching lever 61. The latter is pivoted at 62 and is normally held in the position illustrated in Figure 2 by means of the spring 63.

From the foregoing, it will be obvious that a single manipulation of the switch 48 will serve to close the circuit controlling the solenoid 39, and to retain such circuit closed until it is again opened.

The means which I provide for reopening the foregoing circuit after a predetermined time duration comprises the pair of electrical contacts 64 and 65, the latter being a movable contact and being grounded as shown at 66. The contact 64 is fixed, suitably insulated from the contact 65, and connected by a lead 67 to a solenoid 68, thence through a lead 69 to the lead 43. The solenoid 68 acts upon a susceptible portion 70 of the lever 61 to pull the latter against the action of the spring 63.

In accordance with my invention, the contact 65 is initially adjustable by manual means into any selected one of various positions spaced from the contact 64. Also, the contact 65 is movable by the flow of liquid through the chamber 36 to move the contact 65 into abutment with the fixed contact 64.

Thus, with the valve 38 open, and the contact 65 initially adjusted into, say, the position of Figure 2, the flow of liquid through the chamber 36 will, in a predetermined time proportional to such flow, establish electrical connection between the contacts 64 and 65. This will close a circuit from the ground 66 through the solenoid 68 and through the lead 43, the contact 44, the portion 58, the contact 45, and the leads 46 and 47, to the positive terminal 15. This will energize the solenoid 68, swing the lever 61 to release the keeper 60, and the spring 56 will then operate to break the circuit previously described as controlling the solenoid 39.

The foregoing mechanism is illustrated in somewhat greater detail in Figure 3. The fixed contact 64 is preferably mounted upon a fixed dial element 71 mounted in visible manner beneath a transparent shield 72. The contact 65 is carried by, and preferably directly constituted of, a pointer element 73 adapted to move over the dial 71. The pointer 73 is mounted upon a spindle 74 which extends outwardly through the shield 72 and terminates in the manually controllable knob 75. The rear end of the spindle 74 is provided with a friction disc 76 adapted to cooperate with a complementary friction disc 77 carried by a rearwardly extending spindle 78. A spring 79 holds the discs 76 and 77 in frictional association so that rotation of the spindle 78 will rotate the spindle 74 and move the pointer 73. At the same time, however, manipulation of the knob 75 permits movement of the pointer 73 independently of the spindle 78.

Referring for the moment to the lower portion of Figure 3, I will point out that I have provided a vertical spindle 80 carrying a slotted disc 81. In one of the slots is an upwardly extending rod or finger 82 suitably associated with the mechanism (not shown) in the chamber 36 so that it will rotate whenever liquid flows through the chamber 36, and proportionally to such flow. The rotation of the finger 82 rotates the disc 81 and the spindle 80, and this rotation is transmitted through the gears 83, 84, 85, 86, 87, 88, 89, and 90 to the spindle 78. Flow of liquid through the chamber 36 will always cause rotation of the spindle 78 in a clockwise direction as viewed in Figure 2.

It will now be understood that the dial 71 may be suitably calibrated in pounds, gallons, or the like; that the pointer 73 may be freely adjusted initially by the knob 75 to a desired point on the dial 71; and that subsequent flow of liquid through the chamber 36 will move the pointer 73 in a clockwise manner until it contacts with the contact 64, at which time the flow of liquid will be automatically stopped by the closure of the valve 38.

In accordance with my invention, I also provide a counter or totalizing device 91, the internal mechanism of which is not shown, but which is operated from the spindle 78 by means of the gearing 92, 93, 94, 95, and 96.

The operation of my device will be clear from the description herein given. For example, if sixty pounds of water at a certain temperature are to be fed into the vat 19, the operator merely does the following things. He closes the valves 24 and 25 and opens the valve 23. He manipulates the knob 75 to set the pointer 73 at sixty pounds on the dial 71. He sets the element 18 at the temperature desired. He then pushes the switch 48. From the foregoing description, it will be clear that nothing further need be done by the operator, and sixty pounds of water at the desired temperature will flow into the vat 19. If sixty additional pounds are desired in the vat 19, the operator merely adjusts the pointer 73 back again to the sixty-pound mark and again pushes the switch 48. Or, while the vat 19 is filling, the operator may stand ready to close the valve 23 and open the valve 24 so that after the vat 19 is filled, he may readjust the pointer 73 and push the button 48 so as to get a similar or any other desired amount automatically fed into the vat 20.

The wide applicability of my invention will be obvious from the foregoing, and for this reason I do not limit myself to the same as it is applied to the baking industry. Nor do I mean to limit myself to the specific details herein described and illustrated except so far as the prior art may require. In general, it will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In combination with a fluid meter having in its outlet a normally closed valve with a solenoid arranged in a main circuit for opening the valve, a meter dial, means for closing the solenoid circuit comprising a terminal-bridging member, a secondary circuit having therein an electro magnet actuating said member, and a manually operated push button, a latch arranged to releasably engage said bridge member when in closed position, means for breaking said main circuit comprising an auxiliary circuit having a magnet therein operative to release said latch, a dial pointer connected in said circuit and a fixed contact point positioned on the meter dial in the path of said pointer.

2. In combination with a fluid meter having a pointer and having in its outlet a normally closed electrically-operable valve, a main electric circuit including said valve and a normally open master switch, an electric circuit shunt connected to the main circuit and including a push button and electromagnetically actuated devices operable therefrom for closing said master switch, retaining means for the switch, and switch-releasing means including an electric circuit connected to said main circuit and having said pointer as a movable contact member and also including a co-acting contact element located in the path of said pointer, whereby, when contact is established between said pointer and element, said master switch is freed from retention and permitted to resume its normally open condition at the completion of a desired flow of liquid through the meter.

In witness whereof I have signed this specification this 5 day of November, 1928.

CHARLES GOTTFRIED.